June 19, 1934.  L. V. CRAWFORD ET AL  1,963,227
WINDOW OPERATOR
Filed April 12, 1932    3 Sheets-Sheet 1

Inventor
Lyle V. Crawford
Daniel A. Apple
By *Clarence A. O'Brien*
Attorney

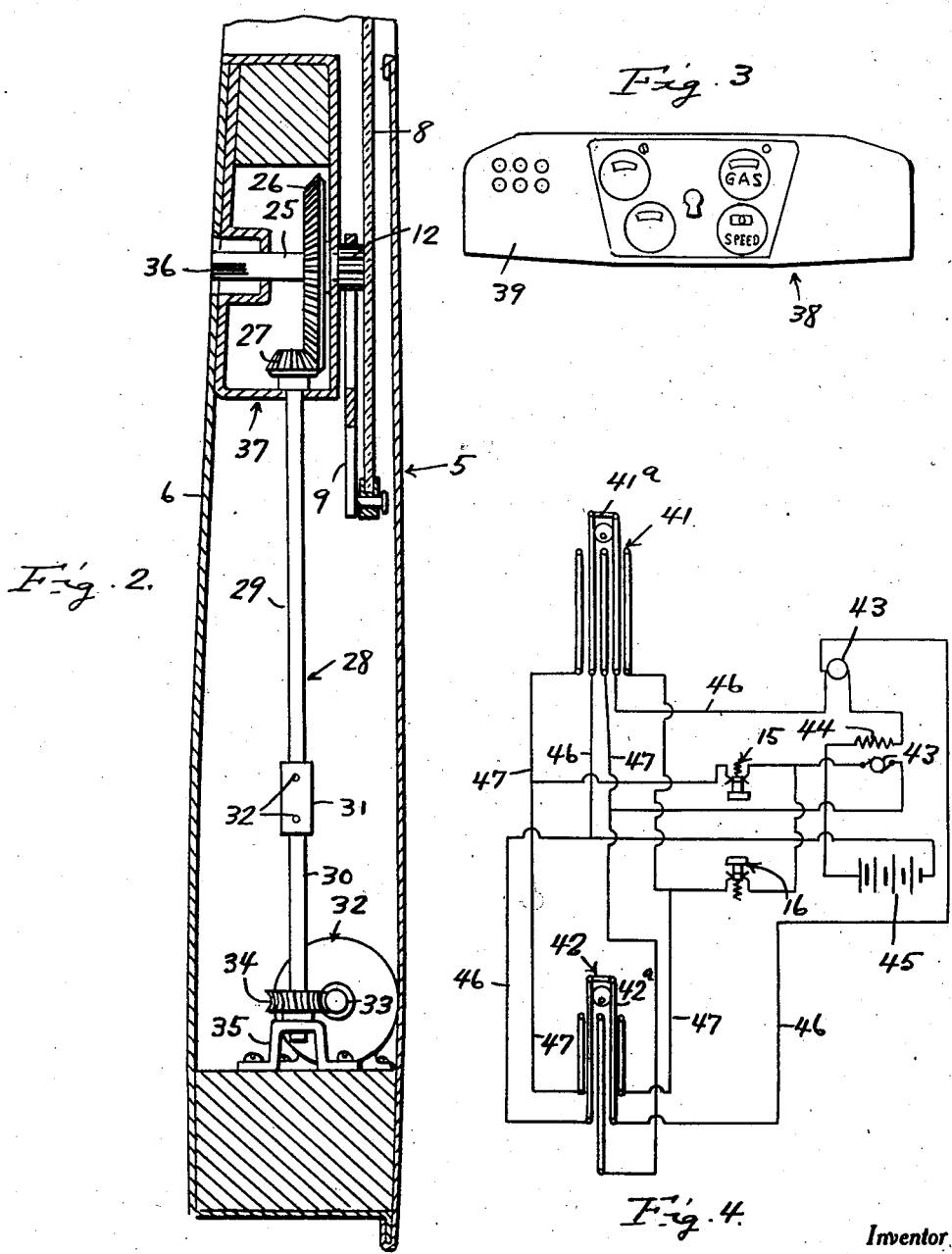

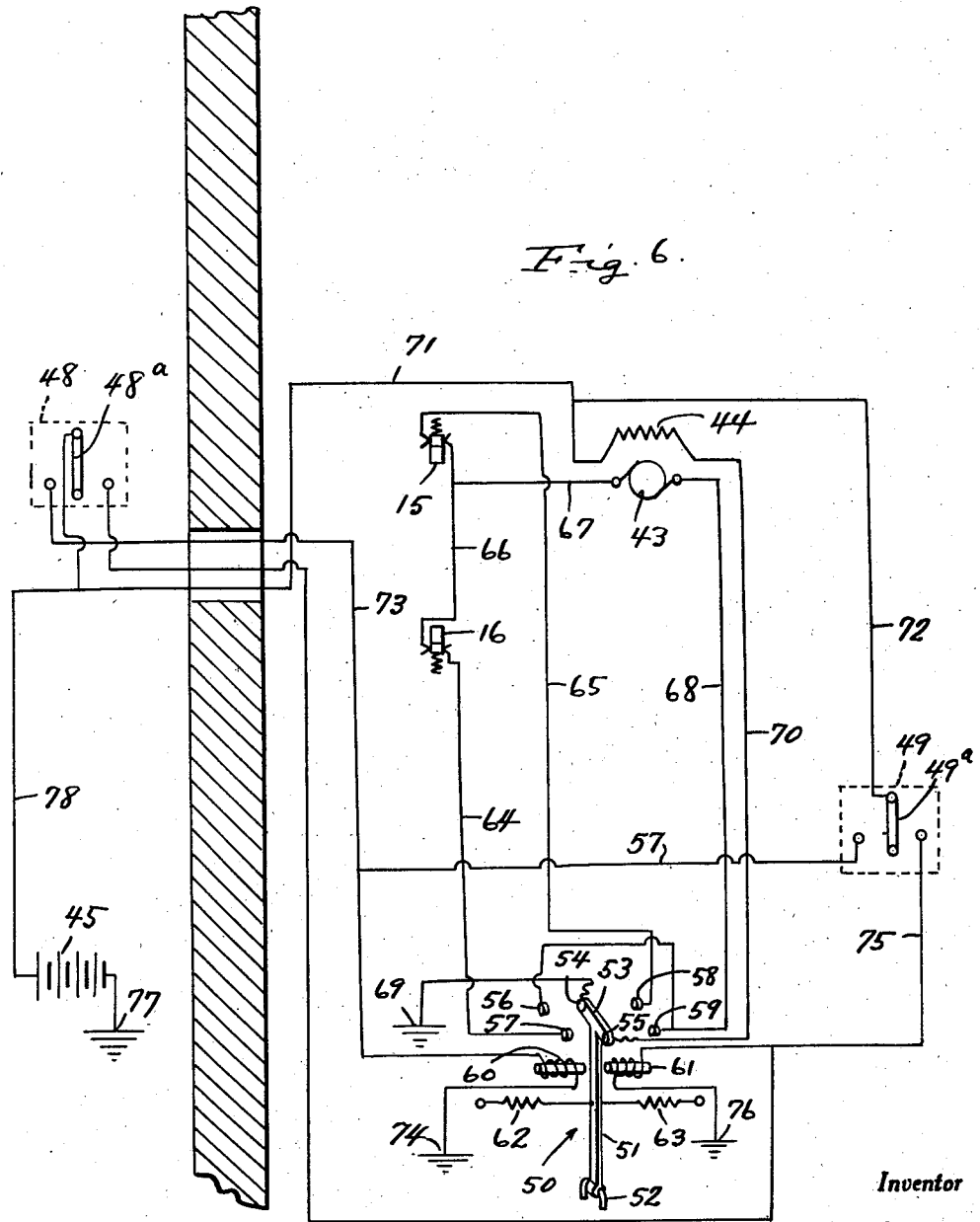

Patented June 19, 1934

1,963,227

UNITED STATES PATENT OFFICE 1,963,227

WINDOW OPERATOR

Lyle V. Crawford and Daniel A. Apple, Paris, Ill.

Application April 12, 1932, Serial No. 604,846

2 Claims. (Cl. 268—124)

Our invention relates to mechanical window operators, and particularly to power driven mechanical window operators, especially suitable for operating the windows of motor vehicles, though the invention is not necessarily restricted to this application.

It is an important object of our invention to provide an operator of this class designed primarily for regular factory installation and equipment of motor vehicle and the like bodies so that the operator of a motor vehicle or the like may operate the windows thereof without manually manipulating them, the device of the invention being capable of being installed in all types of motor vehicles or the like with only small or no changes in the structure thereof.

It is also an important object of our invention to provide a window operator of the type described above which is designed primarily for embodiment as regular factory equipment in motor vehicles, the same being simplified and adapted in structure and in construction for quantity production and incorporation in standard types of motor vehicle bodies.

It is also an important object of our invention to provide a window operator of the type described above which can be installed to operate each of the windows of a motor vehicle or the like, each of the windows being equipped with a separate unit powered by a small electric motor, which consumes less electrical energy than is required for the operation of such electrical accessories as cigar lighters, heaters, lamps and the like, whereby no insupportable burden will be placed upon the conventional battery of the motor vehicle or the like, whereby to provide for cheap and efficient operation of the units.

It is also an important object of our invention to provide a control means for each of the units mentioned and also a central control means whereby the operator of the motor vehicle or the like will be enabled to operate all or any of the windows of the motor vehicle or the like from his position at the wheel of the motor vehicle without changing his position or reaching to the different windows, the units being equipped also for operation individually through the usual manual means in an emergency.

Other objects and advantages of our invention will be apparent from a reading of the following description in connection with the drawings, wherein for purposes of illustration we have shown preferred embodiments of our invention.

In the drawings:—

Figure 2 is a vertical transverse sectional view through Figure 1 showing in enlarged detail the structure of the window operator.

Figure 3 is an elevational view of an instrument panel of a motor vehicle showing a manner of mounting the centralized control means for a plurality of the window operators.

Figure 4 is a diagrammatic representation of the wiring system of the device of the invention utilizing double-pole, double-throw switch controls.

Figure 6 is a vertical sectional view through the door opening surrounding one of the doors of the motor vehicle or the like showing in connection therewith in diagrammatic representation, another embodiment of the invention having a different electrical operation.

Figure 1:
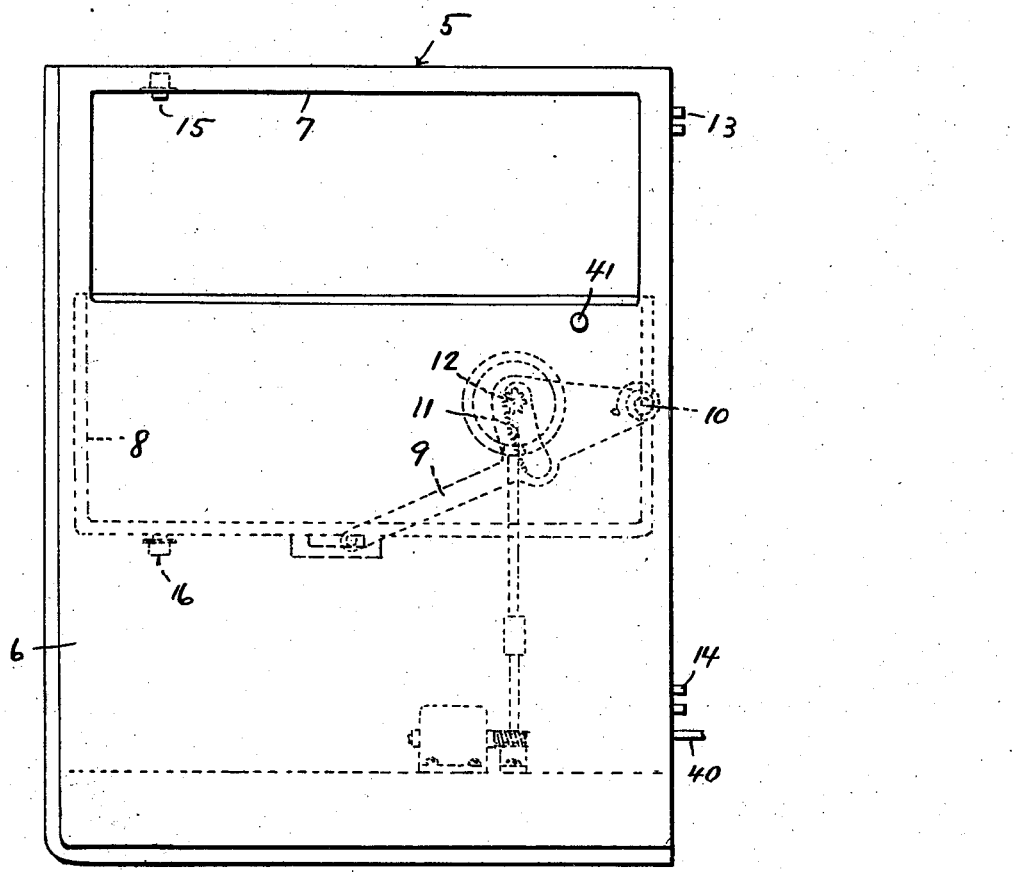
Figure 1 is an elevational view of the inward side of a motor vehicle door showing in dotted lines an embodiment of our power window operator mounted in the door.

While, as stated, the device of the invention is designed primarily to be built into vehicle and the like bodies at the factory, the device may also be marketed as an accessory and installed in vehicle bodies at low cost.

Referring in detail to the drawings, the numeral 5 generally designates a motor vehicle door, the numeral 6 designating the inside or inward panel which is usually constructed in the form of upholstery. The numeral 7 indicates the usual window opening and the numeral 8 designates a conventional form of window glass panel and associated structure which is vertically movable in channels in the sides of the window opening 7 and therebelow by means of a lever 9 which is pivoted at one end as indicated at 10 at one side of the door and has its opposite end pivotally and slidably engaged with a slot at the lower edge of the panel, the lever 9 being provided with an arcuate slot provided with the teeth 11. A pinion 12 is operated in engagement with the teeth 11 for moving the lever 9 so as to open and close the window 8 by moving the panel downwardly or upwardly in the channels referred to. The hinges of the door are indicated by the numerals 13 and 14, respectively.

It will be observed that the device of the invention may be installed in certain types of automobile doors simply by mounting the motor in the lower part thereof, drilling a hole in a member corresponding to the housing 37 to receive the upper end of the shaft 28, and mounting the large bevel gear 26 on the shaft 25, since the lever 9 and the operating shaft 25 and its pinion 12, as well as the housing 37, may be already part of the manual window operating mechanism of the doors.

Figure 5:
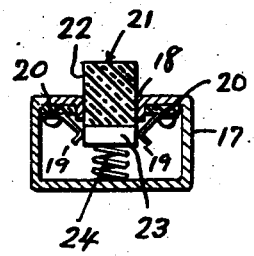
Figure 5 is a transverse vertical sectional view through one of the circuit breakers employed.

The numeral 15 indicates a small circuit breaker which is situated within the upper channel of the door opening and adapted to be operated by contact of the upper edge of window panel 8 when it is in the completely closed position, and the numeral 16 represents a similar circuit breaker supported within the door structure below the window opening in a position to be actuated by the window 8 in its extreme open or downward position, for a purpose to be described. Reference to Figure 5 will disclose that the circuit breakers 15, 16 comprise a suitable metallic casing 17 having an opening 18 in its top from which depends a flange constituting a guide for a spring positioned plunger 21 slidable therein. A dielectric member 20 is carried in the top of the casing and supports depending diametrically opposed spring contacts 19. The plunger 21 has a dielectric portion 22, and a conductive portion 23 on the lower end for bridging the contacts. The spring 24 rising from the floor of the casing normally positions the plunger 21 so that the contacts 19 are bridged by the conductive portion 23 of the plunger, so that a circuit through the spring contacts 19, 19 is normally maintained. This arrangement provides that when the window is not engaged with either of the circuit breakers 15, 16, circuits through these circuit breakers are maintained closed. However, when the window panel is moved to either fully closed or fully open position and into engagement with either circuit breaker, the corresponding circuit will be broken as a result of the displacement of the plunger for a purpose to be described.

Reference to Figure 2 will disclose that the pinion 12 is carried by the shaft 25 to which the usual inside manual window operating handle is connected. Keyed to the shaft 25 within the housing 37 is a comparatively large bevel gear 26. Suitably supported below the bevel gear 26 and in mesh with the bevel gear is a beveled pinion 27 carried on the upper end of a sectional shaft 28 rotatably supported at its upper end in the housing 37 and composed of the upper section 29 and the lower section 30 connected for rotation by means of a sleeve 31 equipped with set screw means 32 to enable disconnection of the sections 29, 30 of the shaft 28 when desired for repair or like purposes. This provision enables the manual operation of the window in the event the power driven mechanism becomes disabled, since the coupling sleeve 31 may in such event be loosened so that the window may be operated with the usual manual means independent of the small electrical motor 32 which is suitably mounted within the lower part of the door and has on its shaft a worm 33 which is meshed with a worm gear 34 carried by the lower end portion of the section 30 of the shaft 28. The lower end of the shaft section 30 may be suitably mounted in a bearing 35. It will be obvious that the end of the shaft 25 to which the manual handle usually employed is to be connected may be covered in some suitable manner so as to be readily accessible in case of disabling of the power driven window operator, so that a handle which may be carried in the automobile at all times may be ready for connection with the shaft 25 for operating the window manually in the usual way.

In Figure 3 is shown a conventional instrument panel 38 upon which is mounted a push button or other type of switch means 39 of a class to be described. In the drawings six of the controls are shown, this being the number corresponding to the usual number of windows in a sedan automobile. A greater or less number of these may be provided according to the number of windows in the different types of motor vehicles or the like. Suitable conductors in an insulated conduit 40 lead from the instrument panel 38 through the body of the vehicle to the battery of the vehicle and to the windows. Where the windows are located in doors, the conduit 40 is led through the vehicle body and out through the edge of the door opening therein adjacent a hinge connection of the door and then through the edge of the door structure into the interior of the door for connection with the motor 32 and the circuit breakers 15, 16. The manner of making the electrical connections between the controls 39, the motor 32, and the circuit breakers 15, 16 will be described below. Two ways of making the connections and associating the related elements are shown herein as illustrative of the invention.

One way of connecting the elements of the invention, shown in Figure 4, will be described first. The numeral 41 and the numeral 42 refer to small double-pole, double-throw, center position switches, identical with or comparable to the Yaxley type of these switches. One of the switches 41 is to be located on each door or on the body of the vehicle adjacent each window, while the switch 42 is to be mounted on the instrument panel and is included in the general designation made by the numeral 39. The outside contact members of the switch 41 are connected to one side of the armature circuit 43 of the motor 32, as shown in the diagram in Figure 4. It will be seen that the lead from one of the outside contact elements has interpolated therein the circuit breaker 15 while the lead from the other outside contact element has interpolated therein the other circuit breaker 16. It should be here stated that both the field and the armature of the motor are series wound. The other side of the armature circuit of the motor is connected to a conductor which connects the center stationary contact element of the switch 41, and the center contact in the switch 42. The movable member 41a of the switch 41 has one side connected to an Ampress device or similar device, by a conductor 46 and a like connection is made from the Ampress device to the movable member 42a of the switch 42. The remaining side of the Ampress or the like device is connected to the series around field 44 of the motor which, in turn, is connected to the conventional battery 45 of the vehicle. The remaining side of the battery is connected to the remaining side of the movable member 42a of the switch 42 and also to the remaining side of the movable member 41a of the switch 41. It will be seen that the field circuit conductors are designated by the numeral 46 while the armature circuit conductors are designated throughout the diagram by the numeral 47.

In Figure 6 is shown a simplified circuit for the device of our invention, wherein is employed instead of the double-pole, double-throw switches of the arrangement shown in Figure 4 there are employed single-pole, double-throw switches 48, 49 of very much simplified character, the use of which requires the employment of a suitable magnetically operated master switch structure 10 such as that generally indicated by the numeral 50. This master switch comprises an iron armature 51 pivotally supported at its lower end on a suitable pivot bracket 52 and having an insulated cross head 53 on its upper end carrying at its ends contacts 54, 55 for coöperation with pairs of contacts 56, 57 and 58, 59 located on either side of the armature 51. Electro-magnets 60 and 61 are located on opposite sides of the armature 51 and suitable spring means 62, 63 are connected to opposite sides of the armature for maintaining it in the intermediate, neutral position.

As seen in Figure 6 the circuit breakers 15, 16 are connected together by the conductor 66, and to the contact 57 by means of the conductor 64, and to the contact 58 by the conductor 65. It will also be observed that the conductor 66 connecting the circuit breakers 15, 16 is connected by means of a conductor 67 to one side of the armature circuit 43 of the motor. The other side of the armature circuit 43 is connected by means of a conduit 68 to the contact point 59 of the magnetic switch, and this is in turn connected to the contact 56 on the opposite side of the switch armature. The contact 54 on the armature 51 is grounded as indicated at 69 and the remaining contact of the armature 51, namely, the contact 55, is connected by means of the conductor 70 to one side of the field circuit 44 of the motor, the other side of the field 44 being connected by conductors 71 and 72 to the movable contact member 48a of the single-pole, double-throw switch 48 and to the movable contact member 49a of the single-pole, double-throw switch 49. A conductor 73 leads from the electro-magnet 60 of the magnetic switch 50 to one of the stationary points of the switch 48, the other side of the electro-magnet 60 being grounded as indicated at 74. The remaining contact of the switches 48 and one of the contacts of the switch 49 are connected by means of the conductor 75 which has a branch connected to one side of the remaining electro-magnet 61 whose remaining side 23 grounded as indicated at 76. A conductor 77 connects the remaining contact of the switch 49 with the conductor 73.

It will be observed that this circuit is energized by the battery 45 which is grounded as indicated at 77 to the frame of the vehicle or the like, a conductor 78 connecting to the conductor 71 which feeds the field of the motor and the movable contact element of the switches 48 and 49.

In both forms of the electrical assemblages just described, the moving of the movable elements of the switches to one side or the other will bring about the elevation or the lowering of the window to which the unit relates. While the connections for these purposes are direct in the form shown in Figure 4, the connections necessary are indirectly made in the form shown in Figure 6. The closing of the switch arms 48a, 49a, with the associated contact points thereof will cause the armature 51 to be swung to either side for making the contacts as described, in one position operating the motor 32 to elevate the window, and in the other position operating the motor to lower the window. It will be obvious that use may be made of the switch means generally designated 39 in the form of circuit shown in Figure 4 to control each and any of the windows from the driver's seat, or any of the windows may be operated through utilizing the door or body mounted switches 41, 48.

Though we have shown and described herein preferred embodiments of our invention, it is to be definitely understood that we do not desire to limit the application of our invention thereto, and any change or changes may be made in materials, and in structure and arrangements, within the spirit of the invention and the scope of the subjoined claims.

What is claimed is:—

1. The combination with a door having an inner and an outer panel, a window opening through the panels provided with side and top grooves, a window panel slidable in the grooves and between the panels below the window opening, of a transverse shaft in the door rotatably supported on the inner panel, a pinion on the shaft, a lever pivoted at one end below and at one side of the window opening and engaged at its opposite end with a portion of the lower part of the window panel, an arcuate series of teeth located at an intermediate point of the lever, said pinion being operatively engaged with the arcuate series of teeth, and actuating means for rotating the shaft for raising and lowering the window panel, said actuating means for rotating the transverse shaft comprising a vertical shaft rotatably supported adjacent the transverse shaft, a large bevel gear on the transverse shaft, a small bevel gear on the vertical shaft, the large and small bevel gears being meshed, and power means between the panels for rotating the vertical shaft.

2. In an operator for a sliding window, an arm consisting of a triangular portion having its apex portion pivotally supported at one side of said window and having a transverse slot located in its base portion, the radially outward edge of said slot being curved and provided with teeth, and a reduced portion extending from the base of said triangular portion and aligned with one side of said triangular portion, the outward extremity of said reduced portion being pivotally and slidably engaged with said window, and a pinion mounted to engage said teeth for operating the window.

LYLE V. CRAWFORD.
DANIEL A. APPLE.